Dec. 27, 1927.

W. E. GOODWIN

BATTERY CONNECTION

Filed Sept. 21, 1926

1,653,999

W. E. Goodwin
Inventor

By C. A. Snow & Co.
Attorneys.

Patented Dec. 27, 1927.

1,653,999

UNITED STATES PATENT OFFICE.

WILLIAM E. GOODWIN, OF CEDAR BLUFF, VIRGINIA.

BATTERY CONNECTION.

Application filed September 21, 1926. Serial No. 136,871.

The present invention has reference to battery terminal connections, and aims to provide novel means whereby a wire may be securely connected to a battery terminal, eliminating any possibility of the wire becoming accidentally disconnected.

Another object of the invention is to provide a device of this character which will be exceptionally simple in construction, and one wherein the connection may be made with facility.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
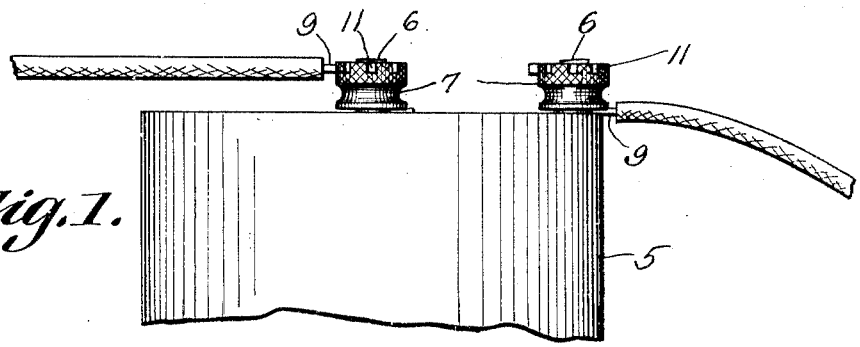
Figure 1 is a fragmental elevational view illustrating a battery equipped with a terminal connection constructed in accordance with the invention.
Figure 2:
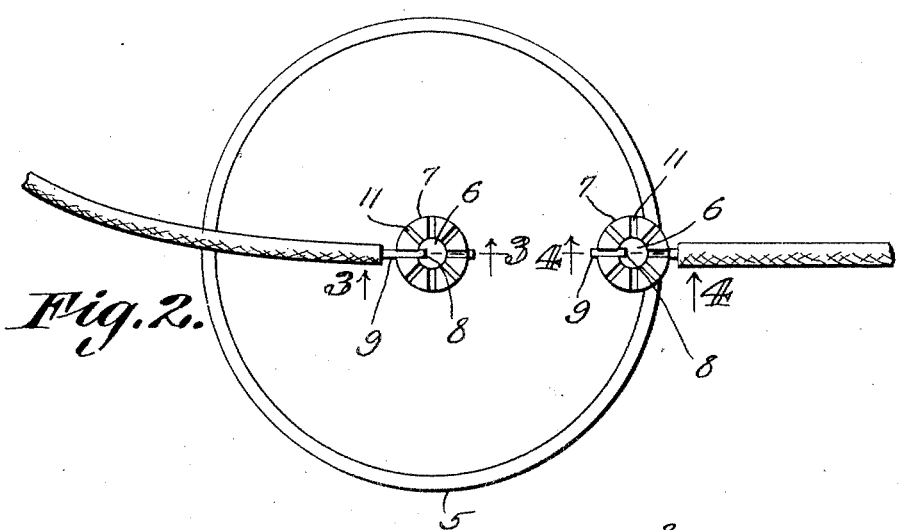
Figure 2 is a plan view thereof.

Referring to the drawing in detail, the reference character 5 indicates a battery and the reference character 6 indicates the posts thereof.

These posts are provided with threads to receive the nuts 7, and as shown, the posts are formed with grooves 8 in the side thereof, which grooves are of widths to receive the wires 9.

Openings 10 are formed in the posts and are disposed adjacent to the upper end of the battery so that when the nuts 7 are properly positioned, they will clamp the wires connected with the posts, to the upper surface of the battery.

The nuts are provided with radiating grooves 11 in the upper edge thereof, which grooves are designed to accommodate the wire which is connected with the battery plate so that the wire acts as a nut lock to lock the nut against movement and insure against displacement of the nut.

Figure 3:
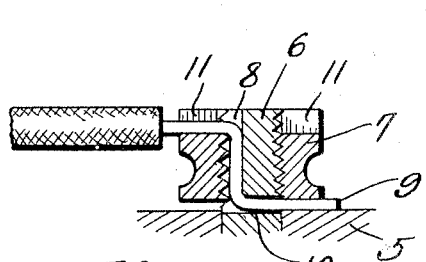
Figure 3 is a sectional view through a terminal wherein the wire is inserted from the top.

As shown by Figure 3, the wire which is indicated at 9 is positioned in the groove 11 of the nut that falls opposite to the vertical groove 8 and passed through the vertical groove 8 and forced laterally through the opening 10 as shown by Figure 3. In order to position this nut when this form of connection is employed, the wire is of course swung vertically and the nut 7 rotated into clamping relation with the wire 9, whereupon the wire is bent into the groove of the nut.

Figure 4:
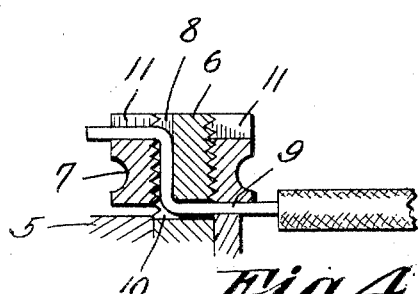
Figure 4 is a sectional view through the terminal wherein the wire is inserted from the bottom.

It may be desirable to secure a wire to the battery post in a manner as shown by Figure 4, in which case the wire is forced laterally through the opening 10 of the battery plate and moved or bent upwardly into the groove 8 of the post.

The nut is now rotated to clamp the wire associated therewith, whereupon the wire is bent laterally to lie in the groove of the nut falling opposite to the groove 8 of the post, locking the nut against rotary movement.

I claim:

In a device of the character described, a battery post having a groove formed in the sides thereof and having an opening extending transversely therethrough adjacent to the base of the groove, said opening and groove adapted to receive an electric wire, a nut positioned on the post, said nut having grooves formed in the upper surface thereof, and said wire adapted to lie in a groove of the nut to prevent rotary movement of the nut.

In testimony that I claim the foregoing as my own, I have hereto affixed my signature.

WILLIAM ERASTUS GOODWIN.